(12) United States Patent
Loudon et al.

(10) Patent No.: US 12,255,775 B2
(45) Date of Patent: Mar. 18, 2025

(54) DEPLOYING A CHANGE TO A NETWORK SERVICE

(71) Applicant: MICROSOFT TECHNOLOGY LICENSING, LLC, Redmond, WA (US)

(72) Inventors: Calum Sutherland Loudon, Edinburgh (GB); Matthew Ian Ronald Williams, London (GB); Peter Louis White, Edinburgh (GB); Colin Michael Tregenza Dancer, Hampshire (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/951,051

(22) Filed: Sep. 22, 2022

(65) Prior Publication Data
US 2024/0031226 A1  Jan. 25, 2024

(30) Foreign Application Priority Data
Jul. 22, 2022 (GB) ...................................... 2210783

(51) Int. Cl.
*H04L 41/0816* (2022.01)
*H04L 41/08* (2022.01)
*H04L 41/0859* (2022.01)

(52) U.S. Cl.
CPC ...... *H04L 41/0816* (2013.01); *H04L 41/0863* (2013.01); *H04L 41/0883* (2013.01)

(58) Field of Classification Search
CPC ............. H04L 41/0816; H04L 41/0863; H04L 41/0883; H04L 41/0843; H04L 41/082; H04L 63/10
See application file for complete search history.

(56) References Cited

U.S. PATENT DOCUMENTS

| 7,546,595 B1 * | 6/2009 | Wickham .................. G06F 8/65 |
| | | 717/174 |
| 7,590,669 B2 * | 9/2009 | Yip ..................... H04L 41/5054 |
| | | 707/999.203 |

(Continued)

OTHER PUBLICATIONS

"International Search Report and Written Opinion Issued in PCT Application No. PCT/US23/024664", Mailed Date: Sep. 18, 2023, 13 Pages.

(Continued)

*Primary Examiner* — Alex H. Tran
(74) *Attorney, Agent, or Firm* — Han Gim; Newport IP, LLC

(57) ABSTRACT

A service orchestrator receives a definition of a change to a network service to be deployed over a plurality of sites of a communications network. The definition comprises a configuration schema with a plurality of fields, which are partitioned into a plurality of different configuration group types. The service orchestrator receives an instance of the configuration group type. The service orchestrator receives conditional convergence logic specifying the received instance each site is to use conditional on a current state instance of the configuration group type used at the site. The service orchestrator sends instructions to each of the sites based on the conditional convergence logic, the instructions comprising the received instance. The instructions are configured to trigger a site convergence agent at each site to deploy the change to the network service according to the received instance of the configuration group type and the conditional convergence logic.

18 Claims, 7 Drawing Sheets

(56) References Cited

U.S. PATENT DOCUMENTS

| | | | | |
|---|---|---|---|---|
| 8,359,645 | B2* | 1/2013 | Kramer | H04L 41/0816 |
| | | | | 726/22 |
| 10,452,407 | B2* | 10/2019 | Ritter | G06F 8/433 |
| 10,705,826 | B2* | 7/2020 | Seki | G06F 8/65 |
| 10,749,751 | B2* | 8/2020 | Wan | H04L 41/0843 |
| 10,880,182 | B1* | 12/2020 | Hermoni | G06F 18/214 |
| 11,029,935 | B2* | 6/2021 | Nakamura | G06F 1/329 |
| 11,150,883 | B2* | 10/2021 | Kripalani | G06F 8/61 |
| 2015/0100579 | A1* | 4/2015 | Oba | H04L 41/0893 |
| | | | | 707/737 |
| 2019/0188006 | A1* | 6/2019 | Ritter | G06F 8/433 |
| 2020/0019400 | A1* | 1/2020 | Zhao | G06F 11/302 |
| 2021/0036914 | A1* | 2/2021 | Nissimoff | H04L 41/082 |
| 2021/0083922 | A1* | 3/2021 | Althaus | H04L 41/042 |

OTHER PUBLICATIONS

Ravula, Shashi, "Achieving Continuous Delivery of Immutable Containerized Microservices with Mesos/Marathon", In Thesis of Master of Science in Technology, May 19, 2017, 84 Pages.

Rossem, et al., "NFV service dynamicity with a DevOps approach: Insights from a use-case realization", In Proceedings of IFIP/IEEE Symposium on Integrated Network and Service Management (IM), May 8, 2017, pp. 674-679.

Sayfan, Gigi, "Mastering kubernetes", In Publication of Packt Publishing Ltd, May 25, 2017, 400 Pages.

Tomarchio, et al., "Cloud resource orchestration in the multi-cloud landscape: a systematic review of existing frameworks", In Journal of Cloud Computing, Sep. 10, 2020, pp. 1-24.

* cited by examiner

DEPLOYING A CHANGE TO A NETWORK SERVICE

CROSS-REFERENCE TO RELATED APPLICATION(S)

This non-provisional utility application claims priority to UK patent application number 2210783.3 entitled "DEPLOYING A CHANGE TO A NETWORK SERVICE" and filed on Jul. 22, 2022, which is incorporated herein in its entirety by reference.

BACKGROUND

In communications networks, network services are often deployed. Network services, for example, are distributed applications running in the communications network that provide services including but not limited to: voice mail, data storage, Voice over Long-Term Evolution (VoLTE), private 5G networks and other services. Network services are typically formed from many smaller pieces, referred to as network functions. Often, once network services are deployed, they continue to be managed, upgraded and configured. New network services can also be deployed within the communications network.

Where new network services are deployed, or existing network services are managed and/or modified, operators of a communication network seek to improve the efficiency with which such changes are applied.

The embodiments described below are not limited to implementations which solve any or all of the disadvantages of known ways of deploying network services.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Where a configuration schema is partitioned into a plurality of configuration group types, changes to a network service that correspond to changes to different configuration group types may be deployed and/or managed in parallel as they are sufficiently independent from each other. By virtue of changes to network services being sufficiently independent, it is possible to specify conditional convergence logic, the conditional convergence logic being used in the deployment of the change to the network service. In various examples, a service orchestrator receives a definition of a network service to be deployed over a plurality of sites of a communications network. The definition of the network services comprises a configuration schema, wherein the configuration schema comprises a plurality of fields. The fields of the configuration schema are partitioned into different configuration group types, that is, the fields are partitioned into a plurality of configuration group types without replication of fields between configuration group types. The service orchestrator receives an instance of a configuration group type. The service orchestrator receives conditional convergence logic specifying the received instance of the configuration group type each site is to use conditional on a current state instance of the configuration group type used at the site. The service orchestrator sends instructions to each of the sites based at least in part on the conditional convergence logic, the instructions comprising the received instance of the configuration group type. The instructions are configured to trigger a site convergence agent at each site to deploy a change to the network service at the site according to the received instance of the configuration group type and the conditional convergence logic.

In various examples, a communications network comprises a plurality of sites and a service orchestrator. The service orchestrator is configured to receive a definition of the network service. The definition of the network services comprises a configuration schema, wherein the configuration schema comprises a plurality of fields. The fields of the configuration schema are partitioned into different configuration group types, that is, the fields are partitioned into a plurality of configuration group types without replication of fields between configuration group types. The service orchestrator is further configured to receive an instances of a configuration group type. The service orchestrator is additionally configured to receive conditional convergence logic specifying the received instance of the configuration group type each site is to use conditional on a current state instance of the configuration group type used at the site. Based at least in part on the conditional convergence logic, the service orchestrator is configured to send instructions to each of the sites, the instructions comprising the received instance of the configuration group type, the instructions triggering a site convergence agent at each site to deploy a change to the network service at the site according to the received instance of the configuration group type and the conditional convergence logic.

In various examples, a service orchestrator receives a configuration schema defining a network service, wherein the configuration schema comprises a plurality of fields and wherein the plurality of fields are partitioned into different configuration group types. The service orchestrator receives an instance of a configuration group type. The service orchestrator additionally receives conditional convergence logic specifying the received instance of the configuration group type a site of a communications network is to use conditional on a current state instance of the configuration group type used at the site. The service orchestrator sends instructions to the site based at least in part on the conditional convergence logic, the instructions comprising the received instance of the configuration group type, the instructions triggering the change to the network service at the site according to the received instance of the configuration group type and the conditional convergence logic.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
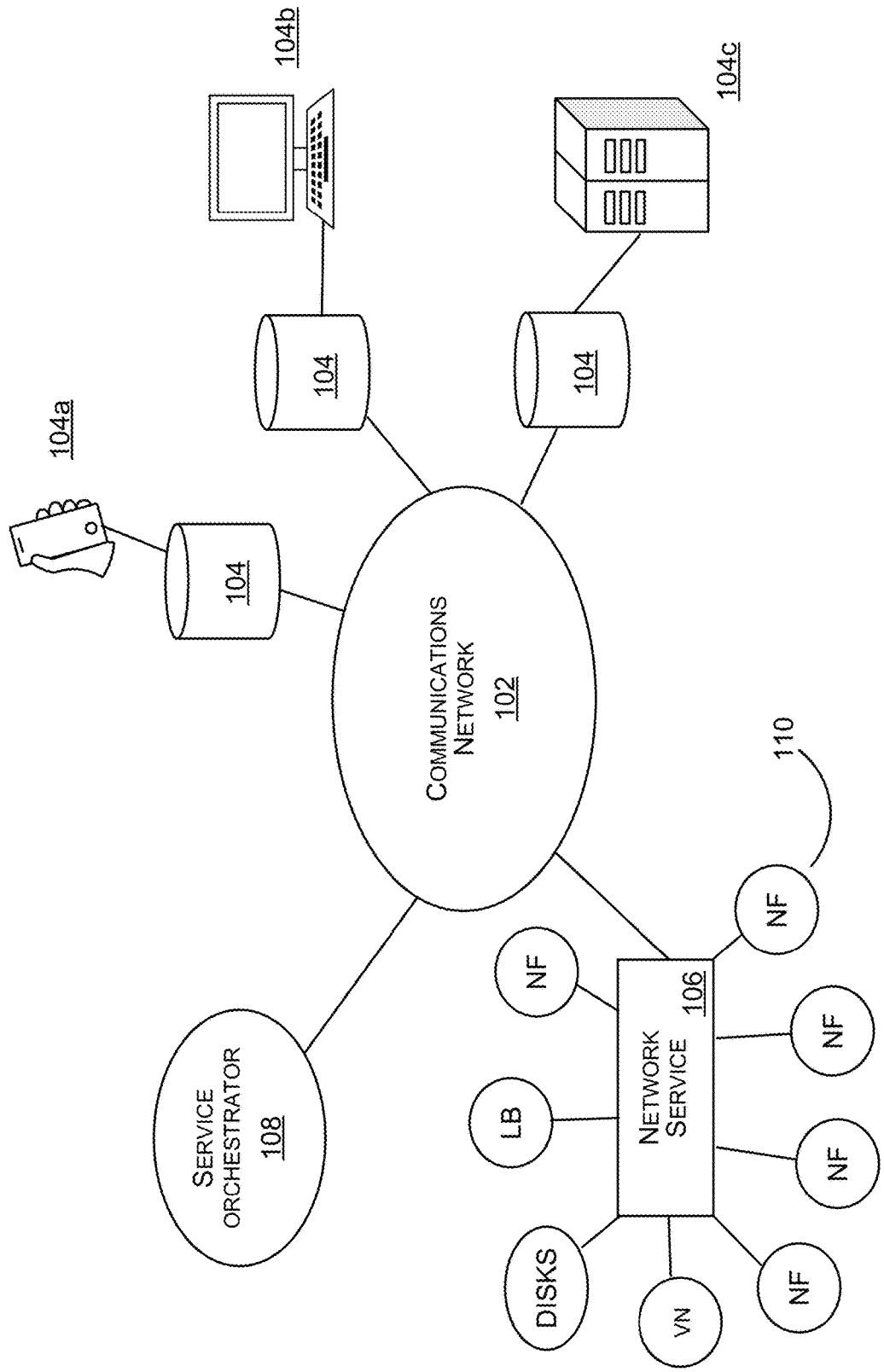
FIG. 1 is a schematic diagram of a network service deployed within a communications network.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above, network services are often deployed, managed and modified within a communication network. There is an ongoing desire to more efficiently manage and deploy changes to such network services. As an example, a change to a network service, such as a software upgrade, may be deployed within a communication network. Deploying a change to a network service in a communications network, can take a significant amount of time. For example, rolling out a software upgrade in a complex communications network can easily take weeks or months before the change has been rolled out across the entire communications network.

Upgrades for a complex system of network functions, especially interdependent network functions, can take a significant amount of time to complete if minimal impact on service delivery is expected. Generally, systems are replaced one at a time, with some time after an upgrade to verify whether the new function is performing as expected. Such systems are upgraded whilst also allowing traffic to ramp up to the new system such that capacity is maintained across the communications network. This reduces the need for a system blackout to upgrade, modify or manage a network service.

Nevertheless, deployment of a change to a network service may be urgent, for example, fixing a zero-day exploit. Urgent deployment of changes to a network service may be achieved by accepting some diminishment of capacity, or on the understanding that the risk of an issue is low due to a network service being limited in scope or acceptable as a lesser risk in the circumstances.

As another example, where the deployment of a change to a network service involves an upgrade of a system, it is possible that a problem with the system upgrade may occur. In such situations, it would be helpful to be able to abort the upgrade and either roll back sites where the upgrade was deployed or apply an emergency patch to sites in which the upgrade was deployed.

As yet another example, during the deployment of a change to a network service, it may become apparent that a different change to the same network service is to be deployed with a higher priority. For example, during a routine upgrade of a network service in a communication network, one may notice that a security certificate used by the communication network will shortly expire. In such cases, it is useful to be able to either slow down or halt the deployment of the initial network service (the network service upgrade in this example) and deploy a second network service (the new security certificate). In such an example, it is helpful where the second network service is deployed at a greater speed than the first network service.

The inventors have recognized that where changes to a network services are sufficiently independent, it is possible to deploy different changes to the network services in parallel, rather than serially. Typically, a definition of a given network service comprises a configuration schema, the configuration schema itself comprising a plurality of fields. As used herein, configuration group types are sufficiently independent where the fields of the configuration schema are partitioned into a plurality of configuration group types without replication of fields between configuration group types. The configuration group types are a partitioning of the fields in the configuration schema into a plurality of discrete, non-overlapping sets.

Where the configuration schema is partitioned into a plurality of configuration group types, changes to network services that correspond to changes to different configuration group types may be deployed and/or managed in parallel as they are sufficiently independent from each other. Therefore, if a change to a network service of a higher priority is to be deployed, through the methods and systems disclosed herein, the speed of deployment of the higher priority change to the network service may be adjusted such that the higher priority change to the network service overtakes the deployment of the lower priority change to the same network service.

Additionally, by virtue of the changes to the network services being sufficiently independent, it is possible to specify conditional convergence logic, the conditional convergence logic being used in the deployment of the change to the network service. As an example, a service orchestrator of a network service determines an instance of a configuration group type to which an instance of a current state configuration group type used at a plurality of sites of a network service distributed is to be converged based at least in part on received conditional convergence logic. Conditional convergence logic in one example specifies that where a current state instance of a configuration group type used at one or more sites over which a network service is distributed is currently converged to instance X of a configuration group type, the deployment of the network service is to cause the site to converge to instance Y of the same configuration group type. As another example, the conditional convergence logic specifies that where a current state instance of a configuration group type used at one or more sites over which a network service is distributed is currently converged to an instance of the configuration group type other than X, the deployment of the change to the network service is to cause the site to converge to instance Y of the configuration group type.

Basing deployment of a change to a network service on received conditional convergence logic enables global rollouts of a change to a network service to be aborted such that operators are able to implement an appropriate strategy for overlapping operations that are to be performed. Additionally, use of such conditional convergence logic provides the ability to run multiple differently-prioritized changes to the same network services at once. This is a result of the network-level overview arising from the service orchestrator by which network services can be run in parallel.

Alternatively, or in addition to the other examples described herein, examples include any combination of the following:

In various examples herein, a service orchestrator receives a definition of a network service to be deployed over a plurality of sites of a communications network. The definition of the network services comprises a configuration schema, wherein the configuration schema comprises a plurality of fields. The fields of the configuration schema are partitioned into a plurality of different configuration group types, that is, the fields are partitioned into the configuration group types without replication of fields between configuration group types. The service orchestrator receives an instance of a configuration group type. The service orchestrator receives conditional convergence logic specifying the received instance of the configuration group type each site is to use conditional on a current state instance of the configuration group type used at the site. The service orchestrator sends instructions to each of the sites based at least in part on the conditional convergence logic, the instructions comprising the received instance of the configuration group type. The instructions are configured to trigger a site convergence agent at each site to deploy a change to the network service at the site according to the received instance of the configuration group type and the conditional convergence logic.

Whilst it is described herein that the service orchestrator receives an instance of a configuration group type, it will be understood that the service orchestrator can receive any number of instances of a given configuration group type. Equally, the service orchestrator may receive one or more instances of any number of the plurality of configuration group types. Nevertheless, in any received conditional convergence logic, it is understood that the conditional convergence logic specifies precisely one instance per configuration group type to which a site is to converge contingent on currently being converged to a different instance of the respective configuration group type.

As used herein, an instance of a configuration group type specifies all values for the plurality of fields included in the configuration group type. For example, a configuration group type A may have two fields: "software version" and "timeout". An instance of configuration group type A, denoted as X in this example, may have the form X={"software version":"v2.0.0", "timeout":60}. In this example, a service orchestrator receives conditional convergence logic which specifies that sites of the communications network are to converge to a particular instance of A contingent on the site currently being converged to a different particular instance of A.

Continuing with this example, it is assumed that there are at present two instances of configuration group type A: X and Y. Whilst this example is described with a configuration group type having two instances, there may be any number of instances for each configuration group type. In this example, instance X takes the form as described above and instance Y takes the form Y={"software version":"v2.0.1", "timeout":30}. In this example, instance X represent a software upgrade to a new major release V2 and instance Y represents a small patch to sites that have undergone the software upgrade to V2. The conditional convergence logic specifies that sites of the communications network should be made to converge to instance Y of configuration group type A contingent on having already converged to X. The service orchestrator sends instructions to the respective site convergence agent using the conditional convergence logic such that the instructions trigger a rollout of the patch based on instance Y of configuration group type A.

The partitioning of the configuration schema into configuration group types results in different configuration group types being sufficiently independent. As the different configuration group types do not contain overlapping fields, it is possible to make adjustments to the different configuration group types in parallel. For example, if one configuration group type is a software upgrade and another configuration group type is a security certificate, it will be possible to make changes to a given network service in parallel as the different configuration group types are sufficiently independent and any changes thereto will not be in conflict.

In various examples, the service orchestrator determines whether a current state instance of the configuration group type used at each site are currently converged to a first instance of the configuration group type. Based on the determination that the current state instance of the configuration group type used at each site is converged to the first instance of the configuration group type, the service orchestrator sends instructions to the respective site convergence agent at each site where the current state instance of the configuration group type used at the site is converged to the first instance of the configuration group type that cause the respective site convergence agents to deploy the change to the network service by converging to the received instance of the configuration group type.

The combination of partitioned configuration group types, and having a condition such that a site if made to converge to instance X of a given configuration group type subject to currently being converged to instance Y of the configuration group type, allows operators of a communications network to implement whatever strategy is appropriate for overlapping operations that they wish to perform.

In various examples, the instructions triggering the site convergence agent at each site to deploy the change to the network service according to the received instance of the configuration group type and the conditional convergence logic comprise triggering the site convergence agent to deploy the change to the network service at each site according to versions of the received instance of the configuration group type specified in the conditional convergence logic, wherein a version of an instance is i) a previous instance of a configuration group type used at a site or ii) a future instance of a configuration group type to be used by a site.

Deploying a change to a network service which causes the version of the current state instance of the configuration group type used at each site of the network service to change enables more efficient modification of the network service. For example, where it is determined that a current instance of a configuration group type used at a site relates to a modification of a network service which contains a bug or a fault, this could be harmful to the communications network. It is possible to replace the current state instance of the configuration group type at the sites with a previous instance of the configuration group type which was known to not contain such bugs or faults, or an improved instance of the configuration type which will not contain such bugs or faults.

In various examples, deploying the change to the network service at a site according to a version comprising a previous value comprises rolling back an upgrade at the site and wherein deploying the network service at a site according to a version comprising a future value comprises rolling out an upgrade at the site.

This is helpful where an upgrade of a system is found to cause problems in the communications network, such as a blackout or an outage of parts of the communications network. Being able to rollback an upgrade prevents an upgrade with a fault or bug from creating a system outage. Being able to rollout a new upgrade where the previous upgrade had a fault prevents the previous upgrade from being applied to the entire system.

In various examples, the service orchestrator receives an instance of another configuration group type of the network service. The service orchestrator additionally receives additional conditional convergence logic specifying the received instance of the other configuration group type each site is to use conditional on a current state instance of the other configuration group type used at the site. In such examples, the service orchestrator sends instructions to the respective site convergence agent at each site where the current state instance of the configuration group type at the site are converged to the first instance of the configuration group type that cause the respective site convergence agent to vary a speed of the deployment of the change to the network service at each site to a first speed. The service orchestrator also sends instructions to each of the sites based at least in part on the additional conditional convergence logic, the instructions comprising the received instance of the other configuration group type, the instructions triggering the site convergence agent at each site to deploy a second change to the network service at the site according to the received instance of the other configuration group type and the additional conditional convergence logic at a second speed.

A plurality of changes to the same network service may be deployed in parallel and at different speeds to each other. For example, if it is desired that two changes to a given network services are to be deployed concurrently, the speed of deployment of each change to the network service can be adjusted. Additionally or alternatively, in various examples, changes to a network service are adjusted based on the nature of that change and the reason for that change. For example, where a security certificate is going to expire within a short time frame, it is desirable to rollout a new certificate urgently. Where a major software upgrade is being performed to the communications network, it is desirable to roll out the upgrade slowly across the network such that it can be verified whether the upgrade is working as intended before deploying the upgrade across all sites of the communications network.

In various examples, the second speed is greater than the first speed. Thus, the speed of a more urgent deployment may be prioritized.

In various examples, sending instructions to the respective site convergence agent at each site where the current state instance of the configuration group type at the site are converged to the first instance of the configuration group type cause the respective site convergence agent to halt the deployment of the change to the network service.

In some examples, a timing of convergence of the respective sites to the instance of the configuration group type specified in the convergence logic is included in a roll-out policy. For example, the conditional convergence logic and a rollout policy may specify that a site is to converge on instance Y of a given configuration group type contingent on currently being converged to instance X of the same configuration group type and according to the roll-out policy R. A timing of convergence of the sites, in this example, is specified in the roll-out policy. An example of roll-out policy R is: first deploy change to site A; wait 30 minutes; deploy change to sites B and C simultaneously; wait 2 hours; deploy change to sites D through G simultaneously. In some examples, manual approval is received between deployment of the change to the network service between sites.

Where a rollout is abandoned, a service orchestrator will not tell any additional sites to converge. Abandoning a rollout has no effect on any sites where a service orchestrator has already instructed a site to converge. In some examples, an instruction to abandon a deployment is orthogonal to conditional convergence logic.

The service orchestrator being able to halt the deployment of a change to a network service is particularly helpful where another higher priority change to a network service is to be deployed. For example, where a first change to a network service is being routinely deployed and is it determined that a different change to a network service is to be urgently deployed, it is useful to pause or halt the deployment of the first, less urgent change to the network service whilst the more urgent change to the network service is deployed. The deployment of the initial change to the network service can then be resumed. Similarly, if it is determined that there is a bug or fault with the first change to the network service, by halting or pausing the first network service, further deployment of the corrupted network service can be paused until a strategy on remediating the change to the network service has been decided upon—e.g. whether to continue the deployment of the corrupted change to the network service and then apply a patch, to rollback the deployment etc.

In various examples, the service orchestrator receives an instance of another configuration group type. The service orchestrator additionally receives additional conditional convergence logic specifying the received instance of the other configuration group type each site is to use conditional on a current state instance of the other configuration group type used at the site. The service orchestrator sends instructions to the respective site convergence agent at each site where the current state instance of the configuration group type used at the site are converged to the first instance of the configuration group type that cause the respective site convergence agent to abandon the deployment of the change to the network service at each site. The service orchestrator sends instructions to each of the sites based at least in part on the additional conditional convergence logic, the instructions comprising at least one of the received other instance (s) of the configuration group types, the instructions triggering the site convergence agent at each site to deploy a second change to the network service at the site according to the received other instance(s) of the configuration group types and the additional conditional convergence logic.

In various examples, the service orchestrator additionally receives a rollout policy, wherein the rollout policy comprises information about how the service orchestrator is to instruct the sites to deploy the network service. The service orchestrator sends further instructions to each of the sites, the further instructions triggering the site convergence agent at each site to deploy the network service at the site based at least in part on the received rollout policy. In some examples, the roll-out policy comprises information relating to an order in which to deploy the change to the network service at the plurality of sites, information relating to a timing of the deployment or any combination thereof.

In various examples, the values of an instance of a given configuration group types are immutable values. Where the values of an instance of the configuration group types are immutable, conflict between changes made in a network service cannot be in conflict. This is because where the configuration group type values are immutable, the values are not changed. Instead, new values are created; thereby avoiding a situation where there is a conflict between various changes in a system.

In various examples, one or more sites are a data centre.

FIG. 1 is a schematic diagram of a change to a network service 106 deployed within a communications network 102. Whilst FIG. 1 depicts a single network service 106, the skilled person will understand that there can be any number of network services within the communications network 102. The communications network 102 further comprises a service orchestrator 108 and a plurality of sites 104, with the network service 106, and changes thereto, being configured to be deployed across the plurality of sites 104. Non-limiting examples of such sites 104 are mobile user devices 104a, computing devices 104b and data centres 104c. The service orchestrator 108 coordinates the deployment of one or more changes to the network service 106 across a plurality of sites 104 of a communications network 102. As shown in FIG. 1, the network service 106 comprises a plurality of network functions (NFs) 110. As shown in FIG. 1, in some examples, the network service 106 comprises one or more of: load balancers (LB), disks and virtual networks (VN). The network functions are configured to be distributed across the plurality of sites 104 in order to deploy the network service 106 and any changes to the network service 106.

Figure 2:
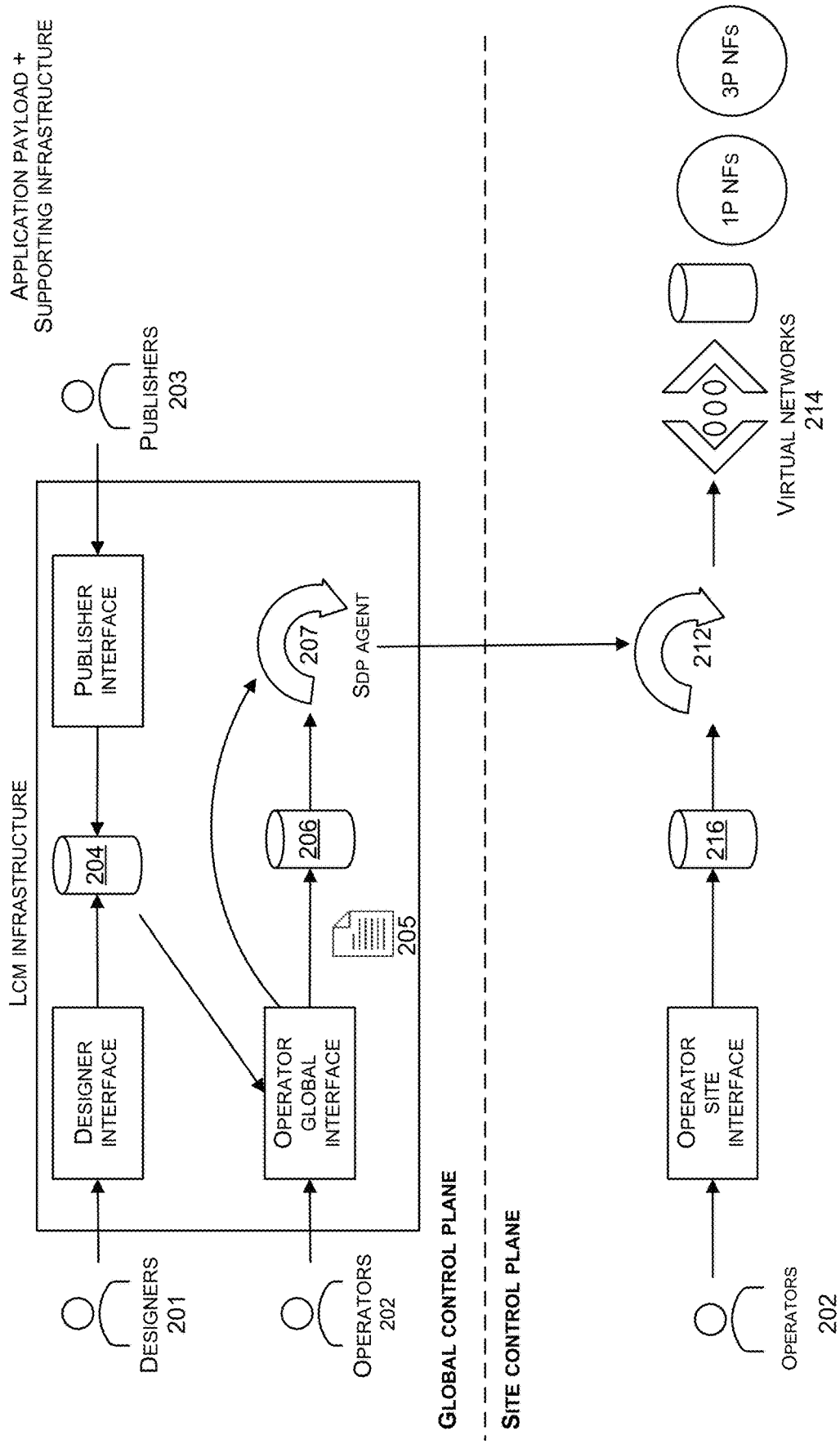
FIG. 2 is a schematic diagram of a global and site control plane of the communications network.

FIG. 2 is a schematic diagram of a global control plane and a site control plane of a communication network, such as communication network 102 depicted in FIG. 1. The global control plane depicts an exemplary architecture for the methods and systems described herein. In some examples, one or more designers 201 design, test, uploads and/or maintains templates for network services. In various examples, the templates for the network services are definitions of the network service which comprise configuration schemas. The templates, in some examples, also comprise information on a composition of the network functions and/or cloud resources that make up the network service. In the same or different examples, the templates further comprise a mapping from the configuration schema they define for the network services as a whole, for example, the configuration group types, to the detailed configuration required by the individual network functions and cloud resources. The global control plane of the communications network in some examples comprises a Lifecycle Manager (LCM). The LCM infrastructure of the communications network in various examples comprises various interfaces through which information can be introduced into the communications network. For example, designers 201 may provide the template to the LCM infrastructure via a designer interface, as depicted in FIG. 2.

Similarly, in various examples, publishers 203 upload definitions of network functions (NFs) to the communications network. This is done, for example, via a publisher interface in the LCM infrastructure.

As depicted in FIG. 2, in some examples, the inputs from the designer 201 and the publisher 203 are provided to system model repository 204. In some examples, an operator provides conditional convergence logic via an operator global interface of the LCM structure. Additionally, in various examples, the operator provides information relating to one or more desired states of sites within the communication network. Optionally, the operator 202 provides a rollout policy to the communication network via the operator global interface of the LCM infrastructure. The network functions and/or templates are also provided to the operator global interface in such examples.

In FIG. 2, conditional convergence logic and information relating to the network service 205 are provided to a global LCM store 206. For example, the conditional convergence logic and information relating to the network service are provided to the LCM store 206 in the form of a declarative configuration. Rollout policies, information relating to one or more desired states of sites within the communication network and information relating to the definition of the network functions may also be provided in the declarative configuration 205. However, the various information provided to the LCM store may be provided individually, rather than in a declarative configuration 205.

Where a rollout policy is provided by the operator 202, the declarative configuration 205 may be provided to a global convergence agent and/or a Safe Deployment Practice (SDP) agent 207. This is alternative to directly providing the declarative configuration 206 to local site convergence agents, such as site convergence agent 212 depicted in FIG. 2. The site convergence agents use the declarative configuration 205 or the information received from the global control plane to drive the respective site to convergence to the desired state expressed by the declarative configuration 205. Optionally, as depicted in FIG. 2, operator 202 further provides information to the site convergence agent 212 via the operator global interface.

The updated states of the respective sites may be stored in virtual networks 214 in a cloud service and executed at the respective sites via network functions (NFs) 1P NFs and 3P NFs. The site convergence agent 212, in some examples, acts on the information received from the global control plane (or the same information provided directly by an operator) to create or update the set of network functions and cloud resources running in that site, for example virtual networks and network functions running in virtual machines (VM) and/or containers.

As used herein, the role of the operator is responsible for the deployment and lifecycle management of a network service. Operators may directly interface with LCM infrastructure to deploy and manage network services. The role of the design is to create and upload network service designs, for example, definitions comprising the configuration schema of a network service. The role of the publisher is to create and upload definitions of network functions. Optionally, binary artefacts and images relating to the network functions are uploaded.

As used herein, a site is a location in which a network service can be instantiated. A network service is an end-to-end service as perceived by an operator. A network service can be considered to be a basic unit that an operator is to lifecycle manage and observe. For convenience, in some examples, a network service is subdivided into nested network functions. A network service design is the design describing a network service of a specific type, not any particular instantiation of it. A network service design is created and uploaded by the designer. Every instance of a network service typically has one network service design, however, there may be multiple versions of the network service design over its lifetime. The network service design includes a configuration scheme. The network service design may also include mapping rules and other components.

Figure 3:
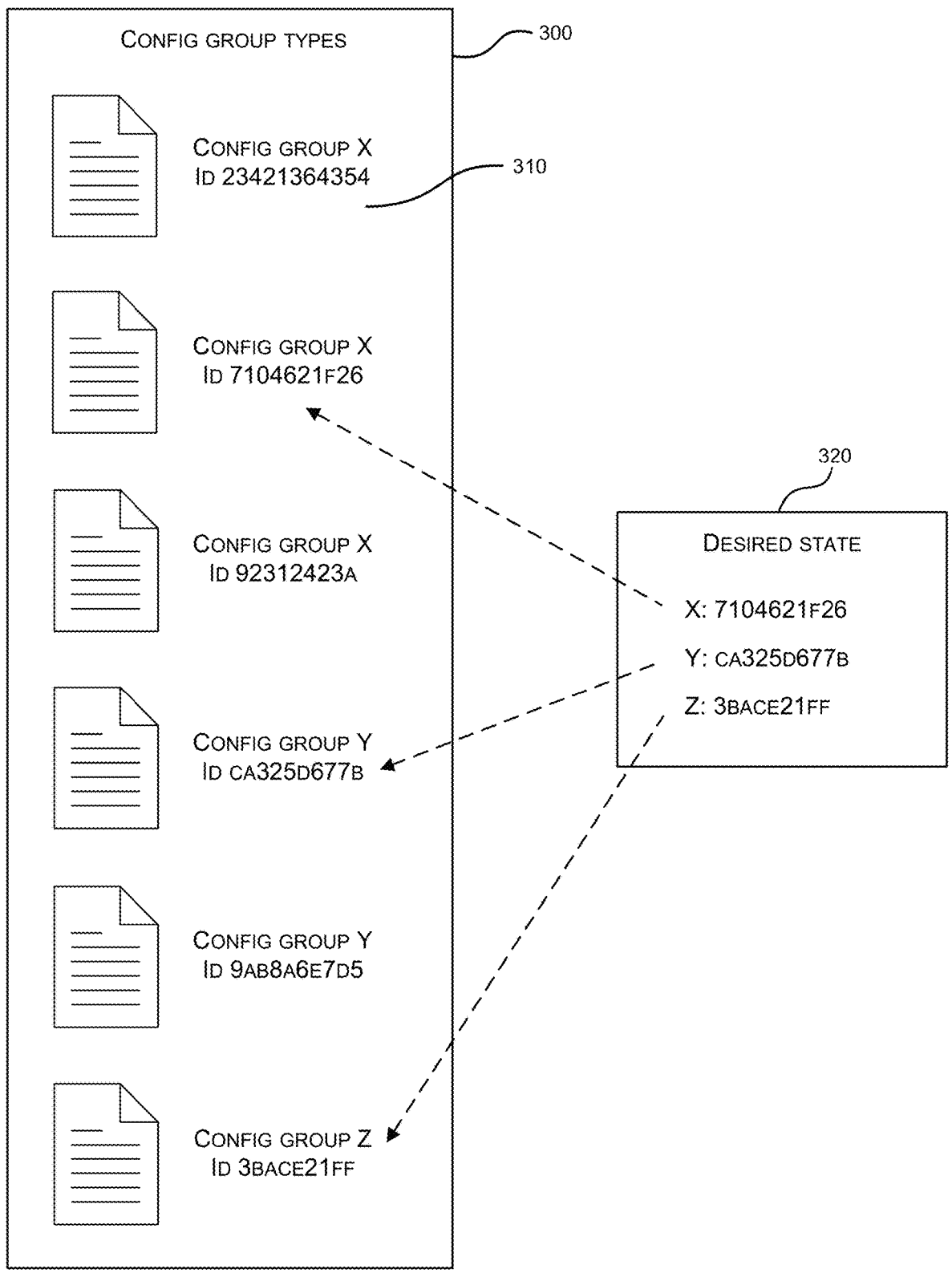
FIG. 3 is a diagram illustrating a plurality of configuration group types.

Typically, configuration schemas represent complex, distributed multi-site systems running in a dynamic environment. It is helpful where these schemas facilitate complexities such as: different operators at global and site level, different operators responsible for the configuration of different aspects of the overall network, sites becoming disconnected from the communications network and interrupting an existing "slow" rollout with a "fast" rollout. The inventors have introduced configuration groups, such as that depicted in FIG. 3. As shown in FIG. 3, there is a configuration group 300 comprising a plurality of configuration group types 310. The configuration group types have different instances which may be driven to converge to a desired state 310. For example, the conditional convergence logic tells the service orchestrator a specific set of configuration group type instances to which a site should converge. Different sites may be told to converge to a different set of configuration group type instances. Changes made to network services are made to be sufficiently independent. This occurs by partitioning the configuration schema of a network service into a plurality of configuration group types. The configuration group types are such that all fields in a configuration schema exist in precisely one configuration group type. That is, there is no replication of fields of a configuration schema between configuration group types. Where the values of the configuration group types are immutable, the configuration group types are assigned a unique identifier. Additionally, configuration groups of different types have independent access control, thereby permitting changes made to a network service to be sufficiently independent. For example, as depicted in FIG. 3, there are three configuration group types in the site: X, Y and Z. As the group types are sufficiently independent, their instances may be changed independently of each other. For example, it is possible to drive configuration group type X to instance $X_1$ whilst simultaneously driving, simultaneously instructing a site to consecutively drive, configuration group type Z to instance $Z_1$.

Figure 4:
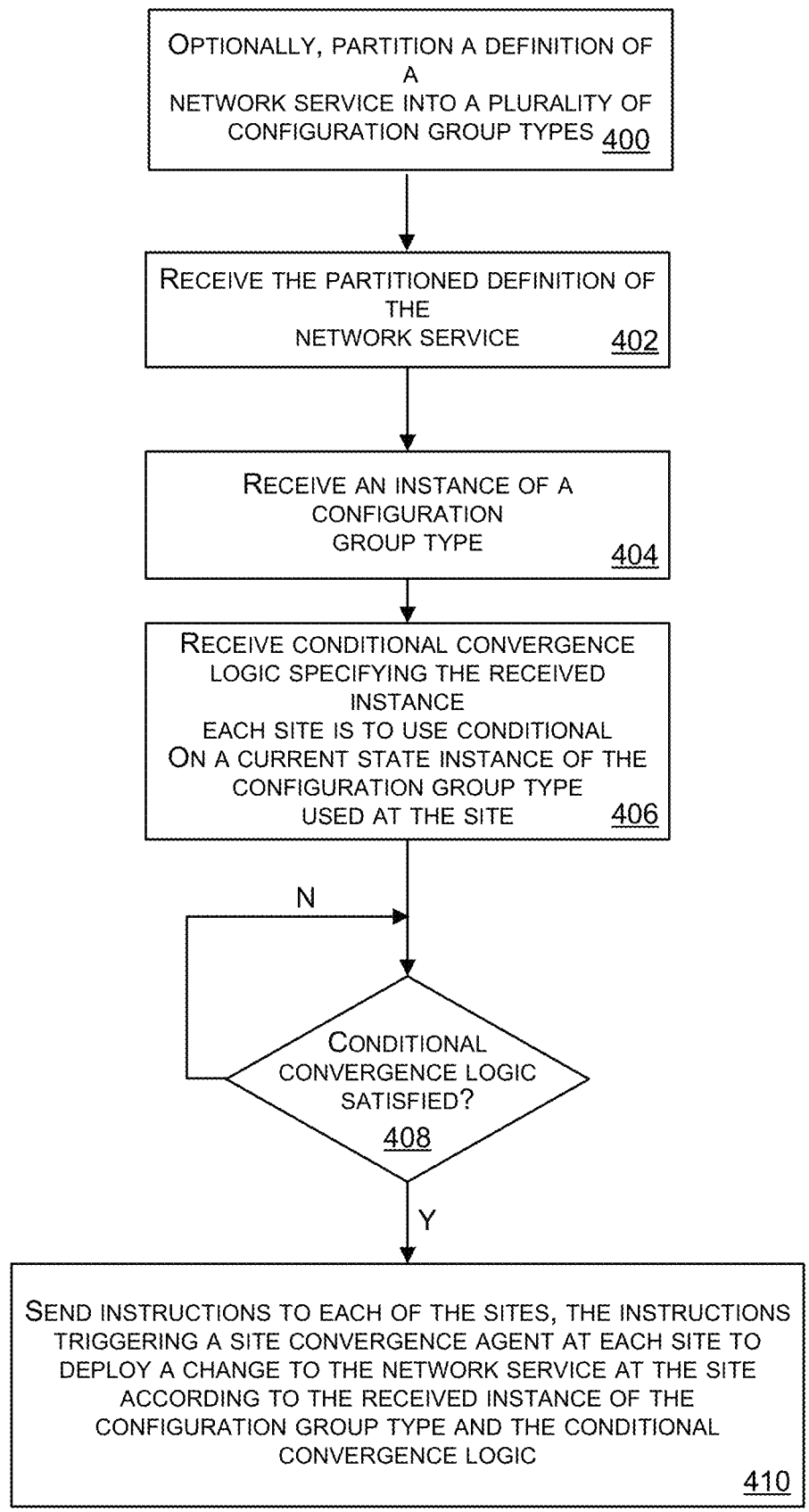
FIG. 4 is a flow diagram of a method for conditional deployment of a network service.

In FIG. 4, a flow diagram of a method for conditional deployment of a change to a network service is depicted. The method is performed by a service orchestrator to deploy a change to a network service distributed over a plurality of sites of a communications network, as illustrated in FIG. 1 for example. Optionally, the service orchestrator, or any other suitable entity, receives a definition of an un-partitioned network service and partitions 400 the definition of the network service into a plurality of configuration group type as described herein. The definition of the network service comprises a configuration schema itself comprising a plurality of fields. In some examples, to partition the plurality of fields of the configuration schema into different configuration group types, a partitioning algorithm is used which partitions the configuration group types without replication of fields between configuration group types. Any partitioning algorithm may be used to partition the plurality of fields into the different configuration group types such that there is no replication of fields between configuration group types. The partitioned definition is used by the service orchestrator to carry out the methods described herein.

In some cases the service orchestrator receives 402 a partitioned definition of the network service from another entity. As described above, the partitioned definition of the network service comprises a configuration schema. The configuration schema itself comprises a plurality of fields, wherein the fields are partitioned into a plurality of configuration group types without replication of fields between configuration group types. The service orchestrator receives 404 an instance of a configuration group type. The service orchestrator also receives 406 conditional convergence logic specifying the received instance of the configuration group type each site is to use conditional on a current state instance of the configuration group type used at the site. In various examples, the operations 402, 404 and 406 are performed as individual steps. However, as described above, in other examples, the operations 402, 404 and 406 occur in a declarative configuration, for example. Where the operations are performed as individual steps, it will be understood by the skilled person that they may be performed in any order.

The service orchestrator makes a determination 408 on whether the conditional convergence logic is satisfied. Where the conditional convergence logic is satisfied, the service orchestrator sends 410 instructions to each of the sites based at least in part on the conditional convergence logic. The instructions comprise the received instance of the configuration group type and trigger a site convergence agent at each site to deploy the change to the network service at the site according to the received instance of the configuration group type and the conditional convergence logic.

In various examples, the service orchestrator additionally receives a rollout policy, wherein the rollout policy comprises information about how the service orchestrator is to instruct the sites to deploy the network service. In some examples, the rollout policy dictates when each site is to receive the instructions which trigger deployment of the network service. For example, the rollout policy may specify that the deployment of the network service is to be on a site-by-site basis such that the deployment of a network service at a given site is completed before the deployment at different site is commenced. Alternatively, the rollout policy may specify that the sites are to be instructed such that the change to the network service is being deployed concurrently at a plurality of sites.

In other examples, the rollout policy additionally or alternatively specifies safety logic that is used to determine whether the deployment of a change to a network service has been carried out safely at a given site. For example, this safety logic is used to determine whether there is a fault in the deployment of a change to a network service, such as a system upgrade. This safety logic helps the service orchestrator determine whether to abandon or halt the deployment of a network service. Using safety logic specified in a rollout policy improves the safety of deploying a network service as potential faults or bugs can be detected by the service orchestrator prior to a full rollout of the network service across all sites.

In some examples, the service orchestrator determines whether the current state instance of the configuration group type used at each site is currently converged to a first instance of the configuration group type. Based on the determination that the current state instance of the configuration group type used at each site is converged to the first instance of the configuration group type, the service orchestrator sends instructions to the respective site convergence agent at each site where the current state instance of the configuration group type used at the site is converged to the first instance of the configuration group type that cause the respective site convergence agents to deploy the change to the network service.

In various examples, different changes to a network service will be assigned to different configuration group types. For example, in various implementations, software versions and certificates will reside in different configuration group types and are decoupled such that any software version will work with any certificate. An operator such as those described herein may trigger a global rollout to converge to a new configuration group type representing new software images using a standard rollout policy that may proceed slowly over weeks. Whilst the slow rollout policy is in progress, the operator may kick off a second, parallel, global rollout to converge to a new configuration group type representing new certificates using an emergency rollout policy. For example, the emergency policy patches all sites approximately simultaneously.

In other examples, an operator may be slowly rolling out a routine upgrade and orthogonally hit a bug which causes an outage. It is desirable that such an outage is remedied urgently. Where a designer of a network service or a service orchestrator has partitioned the configuration schema such that versions of software images to use all reside in one configuration group type, denoted by configuration group type A. Some configuration group types may hold certificates and other security information whilst other configuration group types may hold configuration parameters like timeouts. In an example scenario, it is assumed that the communications network is in a known state where all sites of the network have converged to the same version of configuration group type A. Here, let the version of A=a37. Rolling out a software upgrade corresponds to the operator creating a new configuration group of type A with new software versions, a38 for example. In this example, the service orchestrator rolls out the new software versions contingent on sites having currently converged to A=a37.

In this scenario, midway into the rollout of the new software version, a problem with the new version a38 is discovered. At this point, half the sites have converged onto A=a37 (instance a37 of configuration group type A) and the other half have converged to A=a38 (instance a38 of configuration group type A). In such a situation, there are several ways in which this problem can be remedied. One such example is to stop the current rollout, rollback to a previous version, rollout an emergency patch and restart the slow rollout of the patched routine upgrade. In such an example, the service orchestrator receives conditional converge logic. For example, the conditional convergence logic specifies that for sites of the communications network which have configuration group type values of A=a38, the sites should be made to converge to A=a37. The service orchestrator may subsequently receive conditional convergence logic which specifies that where sites have a current state instance of A=a37, the sites should be made to converge to A=a39, where A=a39 corresponds to a new system upgrade that does not comprise the faults of version A=a38.

As another solution to a problem which occurs midway into the rollout of the software upgrade to A=a38, the service orchestrator receives conditional configuration logic which specifies that where A=a37 (i.e., sites which are yet to be upgraded to the new software version), the respective sites are to converge to A=a38 at a greater speed than that which was previously specified. Thus, in the present example, following a determination that there is a problem with the slow deployment of the software upgrade that corresponds to A=a38, using the conditional convergence logic, the deployment of the software upgrade is rolled out at a greater speed. In such examples, the service orchestrator may receive a rollout policy comprising priority logic which indicates a priority of the deployment.

Where the priority indicated in the rollout policy is greater than a priority of a change to the network service that is in the process of being deployed or which is scheduled to be deployed, the speed of deployment of a change to the network service associated with the instances of the configuration group type specified in the logic is configured to be deployed at a greater speed. For example, if a change to the network service (e.g. corresponding to configuration group type version A=a38) is currently being rolled out with a low priority or with a slow speed (e.g. with priority=low), if the rollout policy specifies that sites are to converge to A=a38 with priority=high, for sites which have not already converged to A=a38, the deployment of the change to the network service corresponding to A=a38 will occur at a faster speed corresponding to a higher priority level.

In other examples, rather than having priority logic in the rollout policy, rollout policy further includes a speed. For example, the rollout policy, in some examples, specifies that for sites whose configuration group type versions are currently converged to A=a37, they should be made to converge to A=a38 at speed X.

In various examples, information relating to a speed of deployment of a change to a network service is contained within a rollout policy. The service orchestrator receives the rollout policy and sends instructions to the respective sites based on the conditional convergence logic, the instructions triggering a site convergence agent at each site to deploy the change to the network service at the site according to the received instance of the configuration group type, the conditional convergence logic and the speed of deployment specified in the rollout policy.

In some examples, the received instance of the configuration group type is an instance of the same configuration group type as that relating to a change which is currently being deployed to a network service. For example, a service orchestrator may be currently deploying, or may have just deployed, a change to a network service relating to a system upgrade. The received instance of the configuration group type in such an example is also of the same configuration group type as the system upgrade.

In other examples, the received instance of the configuration group types is of a different configuration group type to a change to a network service that has been deployed or which is currently being deployed. For example, as above, the service orchestrator may be currently deploying, or may have just deployed, a change to a network service relating to a system upgrade. In this example, where a the received instance if of a different configuration group type, the configuration group type may relate to a security certificate.

Following the rollout of the software upgrade corresponding to A=a38 at a higher speed, a patch may be applied that remedies the problem with the software upgrade corresponding to A=a38. In some examples, the conditional convergence logic specifies at least two conditions: the first being that where a current state instance of the configuration group type A at a given site is converged to A=a37, the site should be made to converge to A=a38 and the second condition being that, where a current state instance of the configuration group type A at a given site are converged to A=a38, the value of configuration group type A at those sites should be made to converge to value A=a40. In this example, A=a40 corresponds to the deployment of a patch to remedy the problem with the system upgrade corresponding to version A=a38.

In various examples, an instance for a plurality of configuration group types is received. Accordingly, the conditional convergence logic that is received by the service orchestrator may specify a plurality of conditions which cause the current instance of the respective configuration group types at a respective site to converge to one or more of the respective received instances of the configuration group types.

As another example of how the service orchestrator may respond following a determination or receipt of information indicating that there is a problem with the system upgrade corresponding to instance A=a38, the conditional convergence logic specifies two conditions: the first being where current state instance of the configuration group type A at a given site is converged to A=a37, the instance of configuration group type A at those sites should be made to converge to instance A=a39 and the second being where a current state instance of the configuration group type A at a given site is converged to A=a38, those sites should be made to converge to instance(s) instance A=a40. Similarly to the above, A=a39 corresponds to a new system upgrade that does not comprise the faults of version A=a38 and A=a40 is a patch to remedy the fault of version A=a38.

As described above, there are many alternatives to remedying a fault which is discovered during the rollout of a network service, such as a system upgrade. However, even where no fault of a deployment of a network service is present, the service orchestrator may nevertheless receive conditional convergence logic to deploy a change to a network service of the same or of a different configuration group type. In such cases, the conditional converge logic may take the form of any of the examples described above.

Figure 5:
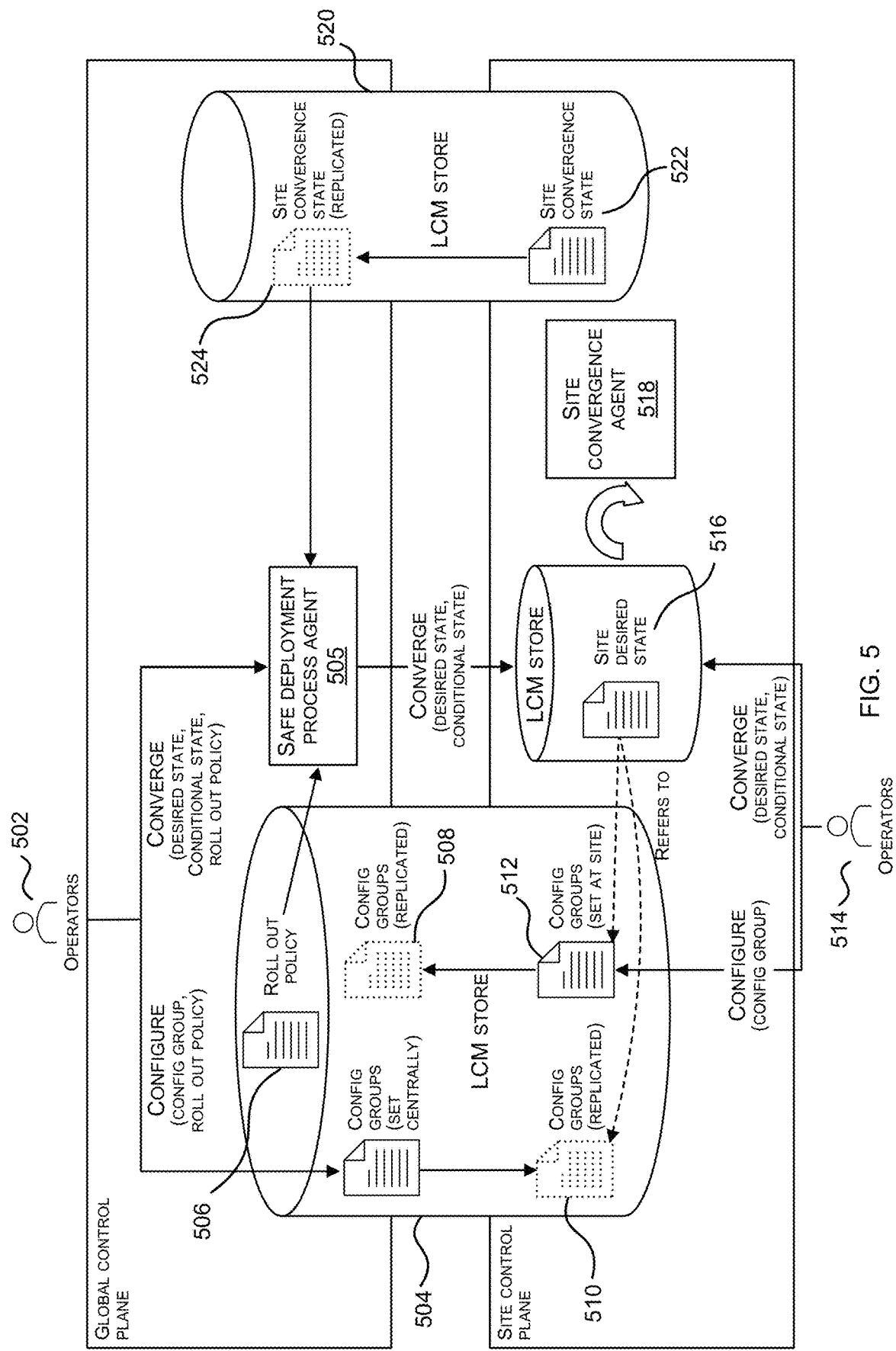
FIG. 5 is a schematic diagram of deploying a network service within a communications network.

FIG. 5 is a schematic diagram of deploying a change to a network service within a communications network. As described above, operators 502, 514 may be used to input information into the communications network. In some examples, an operator inputs information at both the global and site level. In other examples, the one or more operators at the global level 502 are different to the one or more operators at the site level 514. It is helpful where operators are able to create configuration group type instances at either the global or the site level without causing any conflicts. A way in which this is possible without any conflicts is by virtue of, in some examples, the values of the instances of the configuration group types being immutable.

Typically, an instance of a configuration group type is mastered in a global location and then replicated down to the sites. To make a change, an operator or the service orchestrator, edits the file and commits the changes. Where the network between the global location and the site locations go down, the typical approach is to permit an operator at the site level edit the replicated versions of the document locally and apply it locally. However, when the connectivity is restored, and in particular, where another operator has made change to the same file at the global level, the result is a conflict in the network.

In some examples, to overcome the conflict which can arise in scenarios such as these, the configuration group type instances are given a globally unique ID when they are created. This prevents there from being a plurality of versions of the same configuration group type object, only a plurality of instances of the same configuration group type. Additionally, at a global level, it is also possible to more efficiently determine where these differences between sites lie.

In the global control plane, configuration and convergence information are provided. For example, configuration information comprises a definition of a network service, including a configuration schema. In various examples, the configuration further comprises a rollout policy 506. Such configuration information may be included in a declarative configuration. As another example, convergence information comprises conditional convergence logic and desired state information. Desired state information is typically instance(s) for the configuration group type(s) that are desired, for example, configuration group type instance(s) to which an operator would like current state configuration type instance(s) of a site to converge. The convergence information may also include a rollout policy 506.

The configuration groups received from the operator 502 are typically set centrally. The information relating to the configuration groups, in various examples, are replicated 510 within a lifecycle management (LCM) store 504 that branches the global control plane and the site control plane. In various examples, the convergence information received from the operator 502 passes through a safe deployment process (SDP) agent 505. At the SDP agent 505, the convergence information may be combined with the rollout policy 506 to facilitate safe deployment of a change to a network service.

However, in other examples, the configuration information is set at a site level by one or more operators 514. This configuration information is stored in the LCM data store. Where a site-level operator 514 is present, the operator may directly provide the convergence information to an LCM store of a given site of the communication network. In some examples, the operator 514 provides the configuration and convergence information at a site-level via a service orchestrator.

Using the instructions received from the service orchestrator, a site convergence agent 518 at a respective site causes the network service defined by the configuration schema to be deployed. This deployment is based at least in part on the received instance of the configuration group type (for example, the desired state information) and the conditional convergence logic. The site convergence state 522, which is the state of the site following convergence to desired states via deployment of a change to a network service, is replicated 524 in an LCM store 520 which branches the global and site control planes. This LCM store 520 may be distinct from, or the same as, the LCM store 504. In some examples, the replicated site convergence state is provided to the safe deployment agent 505 of the global control plane.

Figure 6A:
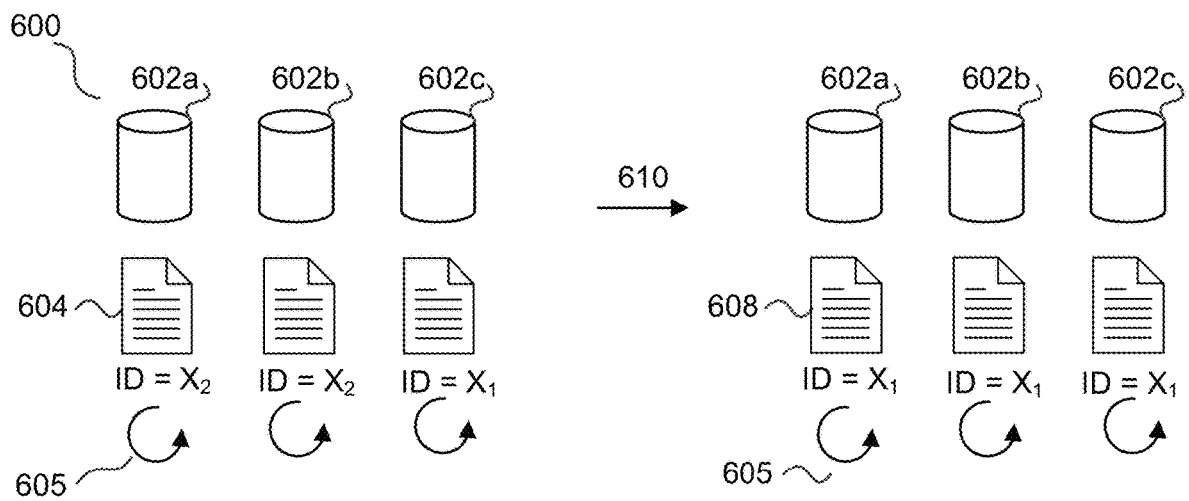
FIG. 6A diagram illustrating the deployment of a network service at a plurality of sites.

FIG. 6A is a diagram illustrating the deployment of a change to a network service at a plurality of sites of a communications network 600. In this simplified example, the communications network 600 comprises three sites 602a, 602b and 602c. The communications network 600 is in the process of deploying a system upgrade of the sites 602a, 602b, 602c included within the communications network 600. The plurality of sites 602a, 602b, 602c have current state instances of the configuration group type X 604. In this example, the existing upgrade comprises updating the instances of the configuration group types X 604 such that instances of the configuration group types X are caused to converge to configuration group type instance "$X_2$". The upgrades to the sites 602a, 602b, 602c are typically carried out by local site convergence agents 605.

In this simplified example, the upgrade is carried out site-by-site such that the upgrades occur chronologically from site 602a to 602c. In FIG. 6A, it can be seen sites 602a and 602b have been upgraded to configuration group type instance "$X_2$" but that site 602c is yet to be upgraded.

FIG. 6A illustrates an example scenario in which it is determined, either by the communications system itself or by an external party, that there is an error in the upgrade of the sites. Here, the upgrade comprises a change to a network service from a configuration group type which is currently converged to $X_2$. For example, at a given site, a safe deployment practice (SDP) agent may determine that the performance of the deployment of a change to a network service, such as a system upgrade, is inadequate. Such errors in an upgrade can cause significant issues such as a blackout of a network service and it is helpful that such errors are remedied as soon as possible and before such system outages occur. Following a determination that the system upgrade contains a fault or that the system upgrade is inadequate in some way, a method such as that depicted in FIG. 4 may be implemented at operation 610. For example, at operation 610 of FIG. 6A, the service orchestrator receives a second instance of the configuration group type X as described herein and receives conditional convergence logic specifying the received instance each site is to use conditional on the current state instance of the configuration group types used at the site.

Based at least in part on the received conditional convergence logic, the service orchestrator of the communications network 600 sends instructions to each of the sites, the instructions comprising the received instance of the configuration group type of the network service, the instructions triggering a site convergence agent at each site to deploy the network service at the site according to the received instance of the configuration group type and the conditional convergence logic. As can be seen in FIG. 6A, the deployment of the network service causes the site convergence agents 605 at sites 602a and 602b to converge to configuration group type instance $X_1$. Site 602c remains converged at its current state configuration group type instance of $X_1$.

Figure 6B:
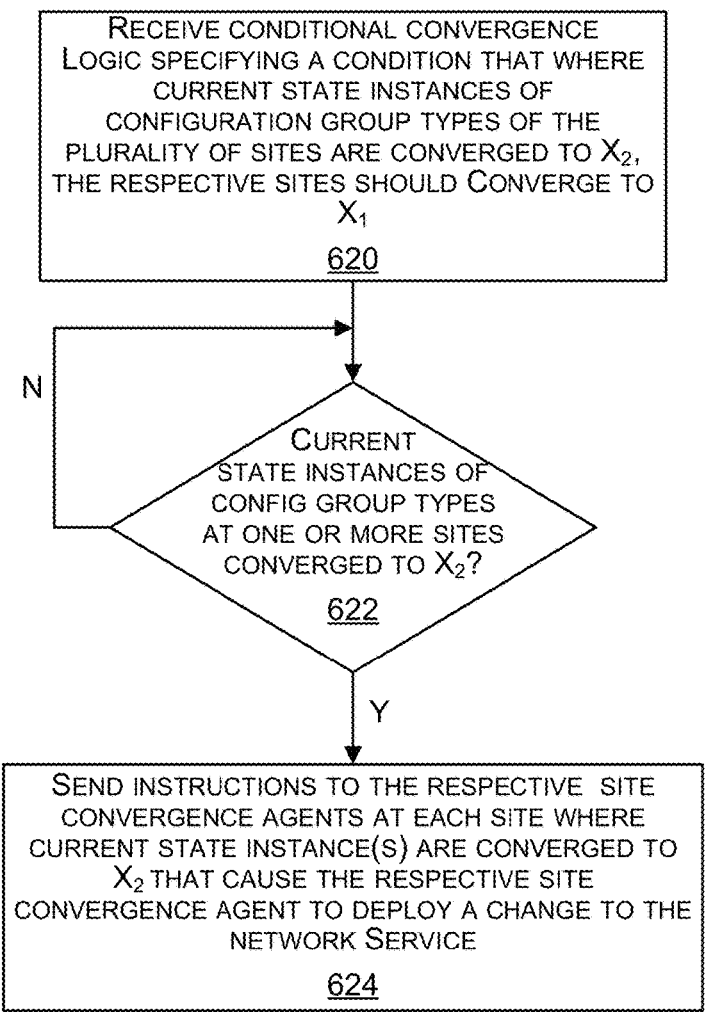
FIG. 6B is a flow diagram of a method of deploying a network service at a plurality of sites.

FIG. 6B illustrates an example of the conditional convergence logic applied in operation 610. In FIG. 6B, the service orchestrator receives 620 conditional convergence logic specifying a condition that where current state instance of configuration group types of the plurality of sites are currently converged to $X_2$, the respective site should converge to instance $X_1$ of the configuration group type. The service orchestrator, for each of the sites 602a, 602b and 602c, determines whether current state instance of the configuration group type is converged to instance $X_2$. If they are converged to instance $X_2$, the service orchestrator sends instructions to the respective site convergence agents at each site where current state values are converged to instance $X_2$ that cause the respective site convergence agent to deploy a modified network service where configuration group types X are converged to instance $X_1$ where they were previously converged to instance $X_2$. In the example scenario illustrated in FIG. 6A, the deployment of a change to a network service involves causing a roll back of the upgrade to sites 602a and 602b, i.e., any site which was upgraded to configuration group type instance $X_2$ is rolled back to configuration group type instance $X_1$.

Whilst not illustrated in FIGS. 6A and 6B, in some examples, the service orchestrator additionally sends instructions to the respective site convergence agent at each site where the current state instance of the configuration group type used at the site is converged to an instance of configuration group type X other than $X_2$ (value $X_1$ in this case for site 602c) that cause the respective site convergence agent to abandon the deployment of the change to the network service. This prevents the deployment of scheduled or in-progress changes to network services, or changes thereto, where it is known that there is a fault in the network service.

In various examples, where a network service is rolled back as illustrated in FIG. 6A, a second a change to the network service may be deployed which does not contain the fault.

In some examples, conditional convergence logic is received by the service orchestrator which causes the deployment of a plurality of changes to the network service, a plurality of changes to an existing network service in a communications network or a combination thereof. For example, using the example scenario of FIGS. 6A and 6B, the conditional convergence logic may specify more than one condition. As an example, the conditional convergence logic specifies two conditions: a) where a current state instance of the configuration group type X is converged to $X_2$, cause the site to converge to instance $X_3$ representing a patch and b) where a current state instance of the configuration group type X is converged to an instance of X other than $X_2$ (e.g. $X_1$), cause the site to converge to instance $X_3$ of configuration group type X, representing an improved upgrade. Where a current state instance of configuration group type X is converged to a no longer desired instance of X, it is more computationally efficient to deploy a patch to such sites than to roll back the network service and subsequently deploy a new upgrade to the network service. For sites which are yet to be upgraded, modified or managed, such sites are caused to converge to instance of configuration group type X relating to the upgraded network service.

Figure 7:
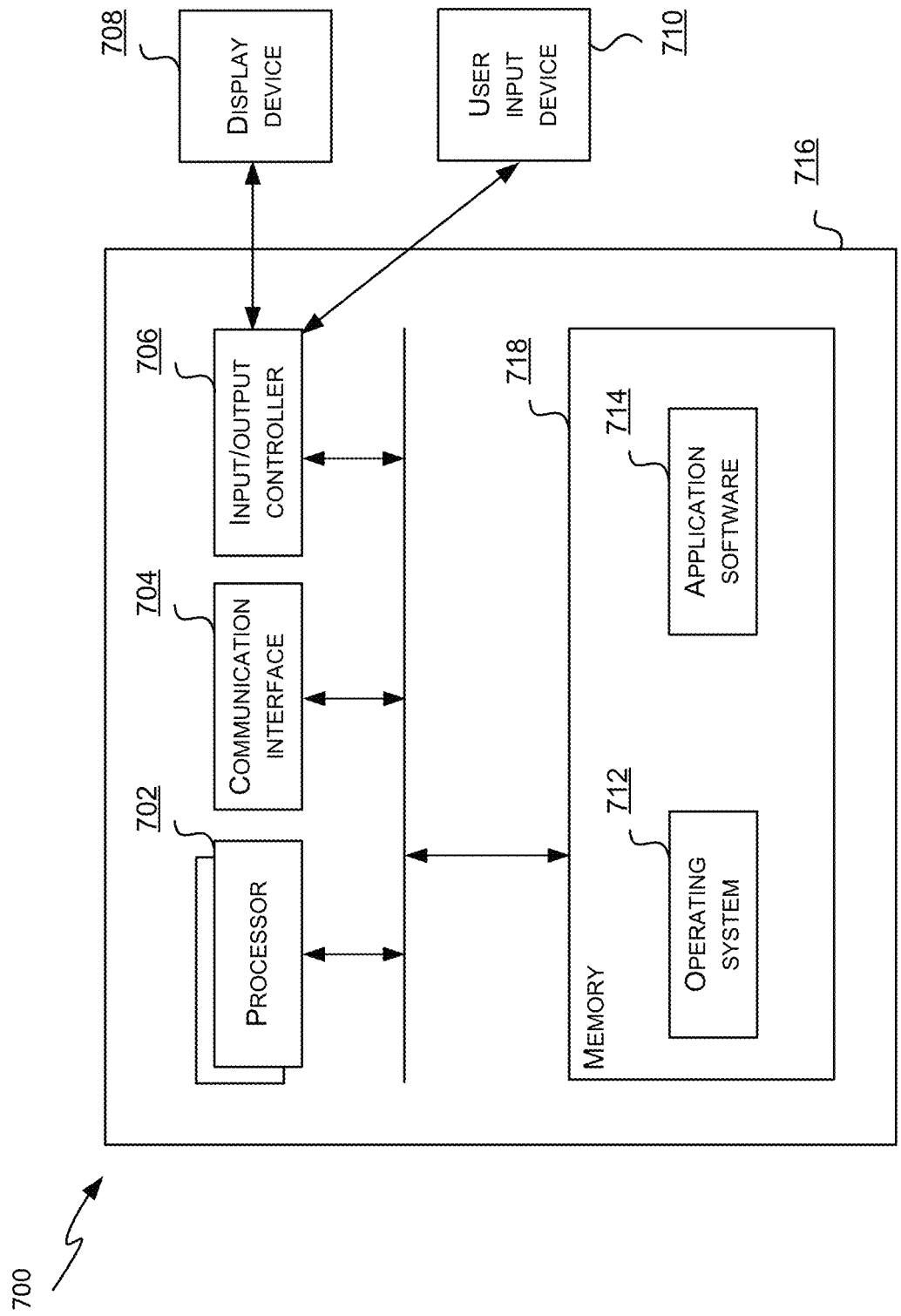
FIG. 7 illustrates an exemplary computing-based device in which methods and systems of the service orchestrator are implemented.

FIG. 7 illustrates various components of an exemplary computing-based device 700 which are implemented as any form of a computing and/or electronic device, in which any of the above embodiments are implemented in some examples. In some cases, the computing-based device 700 is used to implement a service orchestrator in order to execute the method of FIGS. 4, 6A and 6B, for example. In some examples, a service orchestrator is deployed on a device such as in FIG. 7.

Computing-based device 700 comprises one or more processors 702 which are microprocessors, controllers or any other suitable type of processors for processing computer-executable instructions to control operation of the device to implement the examples described above. Platform software comprising an operating system 712 or any other suitable platform software is provided at the computing-based device to enable application software 614, such as a network function or a network service as described herein, to be executed on the device.

The computer-executable instructions are provided using any computer-readable media that is accessible by computing-based device 600. Computer-readable media includes, for example, computer storage media such as memory 718 and communications media. Computer storage media, such as memory 718, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium is not to be interpreted to be a propagating signal per se. Although the computer storage media (memory 718) is shown within the computing-based device 700 it will be appreciated that the storage is, in some examples, distributed or located remotely and accessed via a network or other communication link (e.g. using communication interface 704).

The computing-based device 600 also comprises an input/output controller 706 arranged to output display information to a display device 708 which may be separate from or integral to the computing-based device 700. The display information may provide a graphical user interface. The input/output controller 606 is also arranged to receive and process input from one or more devices, such as a user input device 710 (e.g. a mouse, keyboard, camera, microphone or other sensor). In some examples the user input device 710 detects voice input, user gestures or other user actions and provides a natural user interface (NUI). This user input may be used to set threshold values in the orchestration agent. The user input device 710 may be used by an operator as shown in FIGS. 2 and 5 to input data into the communications network. In some examples, the user input device 710 is used by an operator to input parameter values of instances of one or more configuration types as described herein or to input a configuration scheme. In an embodiment the display device 708 also acts as the user input device 710 if it is a touch sensitive display device. The input/output controller 706 outputs data to devices other than the display device in some examples, e.g. a locally connected printing device (not shown in FIG. 7).

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

In some examples, communications networks as described herein comprise at least one computing-based device such as computing-based device 700, where the computing-based device comprises one or more processors which are microprocessors, controllers or any other suitable type of processors for processing computer executable instructions to control the operation of the device in order to enable a service orchestrator to execute a method according to the examples described herein. In some examples, for example where a system on a chip architecture is used, the processors include one or more fixed function blocks (also referred to as accelerators) which implement a part of the method of the examples disclosed herein in hardware (rather than software or firmware). Platform software comprising an operating system or any other suitable platform software is provided at the computing-based device to enable application software to be executed on the device.

Alternatively or in addition to the other examples described herein, examples include any combination of the following clauses:

Clause A. A method performed by a service orchestrator to deploy a change to a network service distributed over a plurality of sites of a communications network, the method comprising:
  receiving a definition of the network service, wherein the definition comprises a configuration schema, wherein the configuration schema comprises a plurality of fields and wherein the plurality of fields are partitioned into different configuration group types;
  receiving an instance of a configuration group type;
  receiving conditional convergence logic specifying the received instance of the configuration group type each site is to use conditional on a current state instance of the configuration group type used at the site; and
  sending instructions to each of the sites based at least in part on the conditional convergence logic, the instructions comprising the received instance of the configuration group type, the instructions triggering a site convergence agent at each site to deploy the change to the network service at the site according to the received instance of the configuration group type and the conditional convergence logic.

Clause B. The method according to clause A, further comprising:
  determining whether a current state instance of the configuration group type used at each site are currently converged to a first instance of the configuration group type; and
  based on the determination that the current state instance of the configuration group type used at each site is converged to the first instance of the configuration group type, sending instructions to the respective site convergence agent at each site where the current state instance of the configuration group type is converged to the first instance of the configuration group type that cause the respective site convergence agents to converge to the received instance of the configuration group type.

Clause C. The method of clause A, wherein instructions triggering the site convergence agent at each site to deploy the change to the network service at the site according to the received instance of the configuration group type and the conditional convergence logic comprises triggering the site convergence agent to deploy the change to the network service at each site according to a version of the received instance of the configuration group type specified in the conditional convergence logic, wherein a version of an instance is i) a previous instance of a configuration group type used at a site or ii) a future instance of a configuration group type to be used by a site.

Clause D. The method according to clause C, wherein deploying the change to the network service at a site according to a version comprising a previous instance comprises rolling back an upgrade at the site and wherein deploying the change to the network service at a site according to a version comprising a future instance comprises rolling out an upgrade at the site.

Clause E. The method according to clause B, further comprising:
  receiving an instance of another configuration group type;
  receiving additional conditional convergence logic specifying the received instance of the other configuration group type each site is to use conditional on a current state instance of the other configuration group type used at the site;
  sending instructions to the respective site convergence agent at each site where the current state instance of the configuration group type at the site are converged to the first instance that cause the respective site convergence agent to vary a speed of the deployment of the change to the network service at each site to a first speed; and
  sending instructions to each of the sites based at least in part on the additional conditional convergence logic, the instructions comprising the received instance of the other configuration group type, the instructions triggering the site convergence agent at each site to deploy a second change to the network service at the site according to the received instance of the other configuration group type and the additional conditional convergence logic at a second speed.

Clause F. The method according clause E, wherein the second speed is greater than the first speed.

Clause G. The method according to clause B, wherein sending instructions to the respective site convergence agent at each site where the current state instance of the configuration group type used at the site are converged to the first instance of the configuration group type cause the respective site convergence agent to halt the deployment of the change to the network service.

Clause H. The method according to clause B, further comprising:
receiving a second instance of the configuration group type of the network service;
receiving additional conditional convergence logic specifying the received second instance of the configuration group type each site is to use conditional on the current state instance of configuration group type used at the site;
sending instructions to the respective site convergence agent at each site where the current state instance used at the site is converged to the first instance of the configuration group type that cause the respective site convergence agent to abandon the deployment of the change to the network service at each site; and
sending instructions to each of the sites based at least in part on the additional conditional convergence logic, the instructions comprising a the received second instance of the configuration group type, the instructions triggering the site convergence agent at each site to deploy a second change to the network service at the site according to the received second instance of the configuration group type and the additional conditional convergence logic.

Clause I. The method according to clause A, further comprising:
receiving a rollout policy, wherein the rollout policy comprises information about how the service orchestrator is to instruct the sites to deploy the change to the network service; and
sending further instructions to each of the sites, the further instructions triggering the site convergence agent at each site to deploy the change to the network service at the site based at least in part on the received rollout policy.

Clause J. The method according to any preceding clause, wherein values of the instance of the configuration group type are immutable values.

Clause K. The method according to any preceding clause, wherein at least one site is a data centre.

Clause L. A communications network, comprising:
a plurality of sites; and
a service orchestrator which:
receives a definition of the network service, wherein the definition comprises a configuration schema, wherein the configuration schema comprises a plurality of fields and wherein the plurality of fields are partitioned into different configuration group types;
receives an instance of a configuration group type;
receives conditional convergence logic specifying the received instance of the configuration group type each site is to use conditional on a current state instance of the configuration group type used at the site; and
sends instructions to each of the sites based at least in part on the conditional convergence logic, the instructions comprising the received instance of the configuration group type, the instructions triggering a site convergence agent at each site to deploy the change to the network service at the site according to the received instance of the configuration group type and the conditional convergence logic.

Clause M. The communications network of clause L, wherein the service orchestrator:
determines whether a current state instance of the configuration group type used at each site are currently converged to a first instance of the configuration group type; and
based on the determination that the current state instance of the configuration group type used at each site is converged to the first instance of the configuration group type, sends instructions to the respective site convergence agent at each site where current state instance of the configuration group type is converged to the first instance that cause the respective site convergence agents to converge to the received instance of the configuration group type.

Clause N. The communications network of clause L, wherein instructions triggering the site convergence agent at each site to deploy the change to the network service at the site according to the received instance of the configuration group type and the conditional convergence logic comprises triggering the site convergence agent to deploy the change to the network service at each site according to a version of the received instance of the configuration group type specified in the conditional convergence logic, wherein a version of an instance is i) a previous instance of a configuration group type used at a site or ii) a future instance of a configuration group type to be used by a site.

Clause O. The communications network of clause N, wherein deploying the change to the network service at a site according to a version comprising a previous instance comprises rolling back an upgrade at the site and wherein deploying the change to the network service at a site according to a version comprising a future instance comprises rolling out an upgrade at the site.

Clause P. The communications network according to clause M, wherein the service orchestrator:
receives an instance of another configuration group type;
receives additional conditional convergence logic specifying the received instance of the other configuration group type each site is to use conditional on a current state instance of the other configuration group type used at the site;
sends instructions to the respective site convergence agent at each site where the current state instance of the configuration group type at the site are converged to the first instance that cause the respective site convergence agent to vary a speed of the deployment of the change to the network service at each site to a first speed; and
sends instructions to each of the sites based at least in part on the additional conditional convergence logic, the instructions comprising the received instance of the other configuration group type, the instructions triggering the site convergence agent at each site to deploy a second change to the network service at the site according to the received instance of the other configuration group type and the additional conditional convergence logic at a second speed.

Clause Q. The communications network according to clause P, wherein the second speed is greater than the first speed.

Clause R. The communications network according to clause M, wherein sending instructions to the respective site convergence agent at each site where the current state instance of the configuration group type used at the site are converged to the first instance of the configuration group type cause the respective site convergence agent to halt the deployment of the change to the network service.

Clause S. The communication network according to clause M, wherein the service orchestrator:
  receives a second instance of the configuration group type of the network service;
  receives additional conditional convergence logic specifying the received second instance of the configuration group type each site is to use conditional on the current state instance of configuration group type used at the site;
  sends instructions to the respective site convergence agent at each site where the current state instance used at the site is converged to the first instance of the configuration group type that cause the respective site convergence agent to abandon the deployment of the change to the network service at each site; and
  sends instructions to each of the sites based at least in part on the additional conditional convergence logic, the instructions comprising a the received second instance of the configuration group type, the instructions triggering the site convergence agent at each site to deploy a second change to the network service at the site according to the received second instance of the configuration group type and the additional conditional convergence logic.

Clause T. A method performed by a service orchestrator to deploy a change to a network service, the method comprising:
  receiving a configuration schema defining a network service, wherein the configuration schema comprises a plurality of fields and wherein the plurality of fields are partitioned into different configuration group types;
  receiving an instance of a configuration group type;
  receiving conditional convergence logic specifying the received instance of the configuration group type a site of a communications network is to use conditional on a current state instance of the configuration group type used at the site; and
  sending instructions to the site based at least in part on the conditional convergence logic, the instructions comprising the received instance of the configuration group type, the instructions triggering the change to the network service at the site according to the received instance of the configuration group type and the conditional convergence logic.

Clause U. A method to deploy a change to a network service distributed over a plurality of sites of a communications network, the method comprising:
  partitioning a definition of the network service into a plurality of configuration group types, wherein the definition comprises a configuration schema, wherein the configuration schema comprises a plurality of fields and wherein the plurality of fields are partitioned into different configuration group types;
  receiving an instance of a configuration group type;
  receiving conditional convergence logic specifying the received instance of the configuration group type each site is to use conditional on a current state instance of the configuration group type used at the site; and
  sending instructions to each of the sites based at least in part on the conditional convergence logic, the instructions comprising the received instance of the configuration group type, the instructions triggering a site convergence agent at each site to deploy the change to the network service at the site according to the received instance of the configuration group type and the conditional convergence logic.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method performed by a service orchestrator executing on a computing device, the service orchestrator configured to deploy a plurality of differently prioritized upgrades to a network service distributed over a plurality of sites of a communications network, wherein the differently prioritized upgrades are implemented at different speeds, the method comprising:
  receiving a definition of the network service, wherein the definition comprises a first configuration schema comprising a plurality of fields partitioned into different configuration group types that partition the plurality of fields in the first configuration schema into a plurality of discrete non-overlapping sets indicating that each of the different configuration group types are independent and allow for the differently prioritized upgrades to be deployed in parallel;
  receiving a first instance of one of the configuration group types;
  receiving first conditional convergence logic specifying the first instance, wherein each of the plurality of sites of the communications network are configured to use the first instance based on a current state instance of the configuration group type at the site; and
  sending first instructions to each of the sites based at least in part on the first conditional convergence logic, the first instance and first instructions operable to trigger a site convergence agent at each of the sites to deploy a corresponding upgrade to the network service according to the first instance and the first conditional convergence logic, wherein the first conditional convergence logic specifies one instance per configuration group type to which a site is to converge when the site is currently converged to a different instance of a respective configuration group type, and wherein a speed of deployment of a higher priority upgrade is adjustable such that the higher priority upgrade overtakes deployment of a lower priority upgrade by pausing deployment of the lower priority upgrade while the higher priority upgrade is deployed;
  receiving a rollout policy comprising information about how the service orchestrator is to instruct the sites to deploy the plurality of differently prioritized upgrades to the network service; and
  sending second instructions to each of the sites, the second instructions operable to trigger the site convergence agent at each site to deploy the plurality of differently prioritized upgrades to the network service based at least in part on the received rollout policy;
  wherein values of the instances of the configuration group type are immutable values.

2. The method of claim 1, further comprising:
  wherein the first instructions are sent based on determining whether the current state instance of the configuration group type at each site is currently converged to the first instance of the configuration group type.

3. The method of claim 1, wherein the first instructions further cause the site convergence agent to deploy the plurality of differently prioritized upgrades to the network service at each site according to a version of the first instance, wherein a version of an instance is a previous instance of a configuration group type used at a site or a future instance of a configuration group type to be used at a site.

4. The method of claim 3, wherein deploying the plurality of differently prioritized upgrades comprises rolling back an upgrade at the site or rolling out an upgrade at the site.

5. The method of claim 2, further comprising:
  receiving a second instance of another configuration group type;
  receiving second conditional convergence logic specifying the second instance;
  sending third instructions to the respective site convergence agent at each site where the current state instance of the configuration group type is converged to the first instance, the third instructions operable to cause the respective site convergence agent to vary a speed of deployment of one of the plurality of differently prioritized upgrades to a first speed; and
  sending fourth instructions to each of the sites based at least in part on the second conditional convergence logic, the fourth instructions comprising the second instance, the fourth instructions operable to trigger the site convergence agent at each site to deploy a second of the plurality of differently prioritized upgrades to the network service according to the second instance and the second conditional convergence logic at a second speed.

6. The method of claim 5, wherein the second speed is greater than the first speed.

7. The method of claim 2, further comprising sending second instructions to the respective site convergence agent at each site where the current state instance of the configuration group type is converged, wherein the second instructions are operable to cause the respective site convergence agent to halt the deployment of the plurality of differently prioritized upgrades to the network service.

8. The method of claim 2, further comprising:
  receiving a second instance of the configuration group type of the network service;
  receiving second conditional convergence logic specifying the received second instance, wherein each site is configured to use the second instance based on the current state instance of the configuration group type used at the site;
  sending third instructions to the respective site convergence agent at each site where the current state instance used at the site is converged to the first instance, the third instructions operable to cause the respective site convergence agent to abandon the deployment of the plurality of differently prioritized upgrades to the network service at each site; and
  sending fourth instructions to each of the sites based at least in part on the second conditional convergence logic, the fourth instructions comprising the second instance, the fourth instructions operable to trigger the site convergence agent at each site to deploy a second change to the network service according to the second instance and the second conditional convergence logic.

9. The method of claim 1, wherein at least one site is a data center.

10. A communications network, comprising:
  a plurality of sites executing on computing devices; and a service orchestrator executing on the computing devices, the service orchestrator configured to:

receive a definition of a network service, wherein the definition comprises a configuration schema, wherein the configuration schema comprises a plurality of fields and wherein the plurality of fields are partitioned into different configuration group types that partition the plurality of fields in the configuration schema into a plurality of discrete non-overlapping sets indicating that each of the different configuration group types are independent and allow for differently prioritized upgrades to the network service to be deployed in parallel, wherein the differently prioritized upgrades are implemented at different speeds;

receive an instance of a configuration group type;

receive conditional convergence logic specifying the received instance of the configuration group type each site is to use based on a current state instance of the configuration group type used at the site; and send first instructions to each of the sites based at least in part on the conditional convergence logic, the first instructions comprising the received instance of the configuration group type, the first instructions triggering a site convergence agent at each site to deploy a corresponding upgrade to the network service at the site according to the received instance of the configuration group type and the conditional convergence logic, wherein the conditional convergence logic specifies one instance per configuration group type to which a site is to converge when the site is currently converged to a different instance of a respective configuration group type, and wherein a speed of deployment of a higher priority upgrade is adjustable such that the higher priority upgrade overtakes deployment of a lower priority upgrade by pausing deployment of the lower priority upgrade while the higher priority upgrade is deployed;

receive a rollout policy comprising information about how the service orchestrator is to instruct the sites to deploy the differently prioritized upgrades to the network service; and send second instructions to each of the sites, the second instructions operable to trigger the site convergence agent at each site to deploy the differently prioritized upgrades to the network service based at least in part on the received rollout policy;

wherein values of the instances of the configuration group type are immutable values.

11. The communication network of claim 10, wherein the service orchestrator is configured to:

determine whether a current state instance of the configuration group type used at each site are currently converged to a first instance of the configuration group type; and based on the determination that the current state instance of the configuration group type used at each site is converged to the first instance of the configuration group type, send second instructions to the respective site convergence agent at each site where current state instance of the configuration group type is converged to the first instance, the second instructions operable to cause the respective site convergence agents to converge to the received instance of the configuration group type.

12. The communication network of claim 10, wherein the first instructions are operable to trigger the site convergence agent to deploy the differently prioritized upgrades to the network service at each site according to a version of the received instance of the configuration group type specified in the conditional convergence logic, wherein a version of an instance is a previous instance of a configuration group type used at a site or a future instance of a configuration group type to be used by a site.

13. The communication network of claim 12, wherein deploying the differently prioritized upgrades to the network service at a site according to a version comprising a previous instance comprises rolling back an upgrade at the site and wherein deploying the differently prioritized upgrades to the network service at a site according to a version comprising a future instance comprises rolling out an upgrade at the site.

14. The communication network of claim 11, wherein the instance of the configuration group type is a first instance of the configuration group type, wherein the service orchestrator is further configured to:

receive a second instance of a configuration group type;

receive additional conditional convergence logic specifying the received second instance each site is to use based on a current state instance of the other configuration group type used at the site;

send third instructions to the respective site convergence agent at each site where the current state instance of the configuration group type at the site are converged to the first instance, the third instructions operable to cause the respective site convergence agent to vary a speed of the deployment of a first of the differently prioritized upgrades to the network service at each site to a first speed; and sends fourth instructions to each of the sites based at least in part on the additional conditional convergence logic, the fourth instructions comprising the received instance of the other configuration group type, the fourth instructions operable to trigger the site convergence agent at each site to deploy a second of the differently prioritized upgrades to the network service at the site according to the received instance of the other configuration group type and the additional conditional convergence logic at a second speed.

15. The communication network of claim 14, wherein the second speed is greater than the first speed.

16. The communication network of claim 11, wherein the second instructions are operable to cause the respective site convergence agent to halt the deployment of the differently prioritized upgrades to the network service.

17. The communication network of claim 11, wherein the service orchestrator is configured to:

receive a second instance of the configuration group type of the network service;

receive additional conditional convergence logic specifying that the received second instance of the configuration group type each site is to use based on the current state instance of configuration group type used at the site;

send fifth instructions to the respective site convergence agent at each site where the current state instance used at the site is converged to the first instance of the configuration group type that cause the respective site convergence agent to abandon the deployment of the differently prioritized upgrades to the network service at each site; and send sixth instructions to each of the sites based at least in part on the additional conditional convergence logic, the instructions comprising the received second instance of the configuration group type, the sixth instructions operable to trigger the site convergence agent at each site to deploy a second change to the network service at the site according to the received second instance of the configuration group type and the additional conditional convergence logic.

18. A method for deploying a plurality of differently prioritized upgrades to a network service, wherein the differently prioritized upgrades are implemented at different speeds, the method comprising:

receiving a configuration schema defining a network service, wherein the configuration schema comprises a plurality of fields and wherein the plurality of fields are partitioned into different configuration group types that partition the plurality of fields in the configuration schema into a plurality of discrete non-overlapping sets indicating that each of the different configuration group types are independent and allow for differently prioritized upgrades to be deployed in parallel;

receiving an instance of one of the configuration group types;

receiving conditional convergence logic specifying the received instance of the configuration group type that a site of a communications network is to use based on a current state instance of the configuration group type used at the site; and sending instructions to the site based at least in part on the conditional convergence logic, the instructions comprising the received instance of the configuration group type, the instructions operable to a corresponding upgrade to the network service at the site according to the received instance of the configuration group type and the conditional convergence logic, wherein the conditional convergence logic specifies one instance per configuration group type to which a site is to converge when the site is currently converged to a different instance of a respective configuration group type, and wherein a speed of deployment of a higher priority upgrade is adjustable such that the higher priority upgrade overtakes deployment of a lower priority upgrade by pausing deployment of the lower priority upgrade while the higher priority upgrade is deployed;

receiving a rollout policy comprising information about how to instruct the sites to deploy the plurality of differently prioritized upgrades to the network service; and sending second instructions to each of the sites, the second instructions operable to trigger each site to deploy the plurality of differently prioritized upgrades to the network service based at least in part on the received rollout policy;

wherein values of the instances of the configuration group type are immutable values.

* * * * *